United States Patent
Chung

(10) Patent No.: US 9,756,063 B1
(45) Date of Patent: Sep. 5, 2017

(54) IDENTIFICATION OF HOST NAMES GENERATED BY A DOMAIN GENERATION ALGORITHM

(71) Applicant: Yueh Hsuan Chung, Taipei (TW)

(72) Inventor: Yueh Hsuan Chung, Taipei (TW)

(73) Assignee: TREND MICRO INC., Shibuya-Ku, Tokyo (JP)

(*) Notice: Subject to any disclaimer, the term of this patent is extended or adjusted under 35 U.S.C. 154(b) by 14 days.

(21) Appl. No.: 14/553,879

(22) Filed: Nov. 25, 2014

(51) Int. Cl.
*H04L 29/06* (2006.01)
*H04L 12/26* (2006.01)

(52) U.S. Cl.
CPC .......... *H04L 63/1425* (2013.01); *H04L 43/04* (2013.01)

(58) Field of Classification Search
CPC ..... H04L 43/04; H04L 63/14; H04L 43/1425; G06F 21/55; G06F 21/566; A01B 12/006
USPC .................................................... 726/22–24
See application file for complete search history.

(56) References Cited

U.S. PATENT DOCUMENTS

| | | | |
|---|---|---|---|
| 8,260,914 B1* | 9/2012 | Ranjan ................ | H04L 61/1511 709/224 |
| 8,494,897 B1* | 7/2013 | Dawson ................ | G06Q 10/10 705/14.42 |
| 9,405,903 B1* | 8/2016 | Xie ......................... | G06F 21/56 |
| 2003/0154394 A1* | 8/2003 | Levin .................... | H04L 12/585 726/24 |
| 2005/0091321 A1* | 4/2005 | Daniell .................. | H04L 51/12 709/206 |
| 2016/0036836 A1* | 2/2016 | Grill .................... | H04L 63/1416 726/23 |

OTHER PUBLICATIONS

Manos Antonakakis, Jeremy Demar, Christopher Elisan, and John Jerrim, (2012) "DGAs and Cyber-Criminals: A Case Study", Damballa Research Note, URL: https://www.damballa.com/downloads/r_pubs/RN_DGAs-and-Cyber-Criminals-A-Case-Study.pdf, 9 Pages.

Sandeep Yadav, Ashwath Kumar Krishna Reddy, and Supranamaya Ranjan, (2012) "Detecting Algorithmically Generated Domain-Flux Attacks with DNS Traffic Analysis", IEEE/ACM Transactions on Networking (TON), vol. 20 Issue 5, Oct. 2012, pp. 1663-1677.

Yong-lin Zhou, Qing-shan Li, Qidi Miao, and Kangbin Yim, (2013) "DGA-Based Botnet Detection Using DNS Traffic", Journal of Internet Services and Information Security (JISIS), vool. 3, No. 3/4, pp. 116-123.

* cited by examiner

*Primary Examiner* — Beemnet Dada
*Assistant Examiner* — Kalish Bell
(74) *Attorney, Agent, or Firm* — Beyer Law Group LLP

(57) ABSTRACT

Host name raw data from access logs of computers is grouped into distinct groups. At least one feature, an alphanumeric or alphabetic-only digest, is extracted from each group and its characters are ordered depending upon their frequency of use. Sampling is performed upon host names from a database of known normal host names to generate groups of randomly selected host names. Similar digests are also extracted from these groups. The digest from the raw data is compared to each of the digests from the normal host names using a string matching algorithm to determine a value. If the value is above a threshold then it is likely that the host names from the raw data group are domain-generated. The suspect host names are used to reference the raw data access log in order to determine which user computers have accessed these host names and these user computers are alerted.

13 Claims, 6 Drawing Sheets

Work Flow

Work Flow

DGA Output Example

```
                                                    486
                                                     ⌐
                                 pip n_log n_ho n_dga n_hour n_dga_hour
                              1: 10.28.1.172  57     38    6      6         2
                                                                                    500
                                                                                    ⌐
                                   dt                  ho pa scra dc
                              1: 2014-03-24 04:00:47   16b52.s3njd.com  / 49 US
                              2: 2014-03-24 04:00:47   3zntli.s3njd.com / 49 US
                              3: 2014-03-24 04:14:47   cpep.zxm44p.com  / 49 US
                              4: 2014-03-25 04:23:10   zxwar6md.s3njd.com / 49 US
                              5: 2014-03-26 07:02:03   co21x.s3njd.com  / 49 US
                              6: 2014-03-26 07:02:03   ju9ad9.s3njd.com / 49 US
                                     590          592        594

486
                                                     ⌐
                                 pip n_log n_ho n_dga n_hour n_dga_hour
                              1: 10.28.1.173  33     22    7      7         3
                                                                                    502
                                                                                    ⌐
                                   dt                  ho pa scra dc
                              1: 2014-03-21 11:15:56   pysorh06.s3njd.com / 7190 US
                              2: 2014-03-27 05:08:57   10pw.s3njd.com   / 49 US
                              3: 2014-03-27 05:08:57   n0sc.s3njd.com   / 49 US
                              4: 2014-03-28 07:26:18   5piziny.iee826.com / 7193 US
                              5: 2014-03-28 07:26:18   1wbgo30x.iee826.com / 7193 US
                              6: 2014-03-28 07:37:30   x8k0oi.iee826.com / 7193 US
                              7: 2014-03-28 07:37:30   aat761q.iee826.com / 7193 US
                                     595          597        599
```

*FIG. 5*

IDENTIFICATION OF HOST NAMES GENERATED BY A DOMAIN GENERATION ALGORITHM

FIELD OF THE INVENTION

The present invention relates generally to identification of malicious software. More specifically, the present invention relates to identification of malicious host names used by a robot network.

BACKGROUND OF THE INVENTION

Nowadays, a domain generation algorithm (DGA) is frequently used for malicious purposes by unscrupulous individuals. Malware such as Zeus or Conficker uses DGA-generated host names for command and control callback purposes in their robot networks. For example, a variant of the latter is able to generate up to 50,000 random domains every day, making it difficult for a traditional blacklist approach to thwart this malicious software.

In the prior art, several approaches have been developed for the detection of DGA-based robot networks. Although these approaches may differ by the features selected (or derived) to discriminate host names generated by a domain generation algorithm ("DGA-based host names") from those of ordinary benign host names, they have a common focus. That focus is to use large quantity of DNS query data collected from an Internet service provider as the input source and the main objective is to find the entity behind the robot network, whether previously known or unknown. Such an approach usually involves using a classification scheme to differentiate normal host names from DGA-based host names, and in most cases the differentiation is done by using groups of host names instead of individual host names. The disadvantage of this approach is that it requires a large amount of DNS query data from a variety of different sources, which may not be available in practice.

Accordingly, new techniques are desired to assist in the identification of host names that may have been generated by a domain generation algorithm.

SUMMARY OF THE INVENTION

To achieve the foregoing, and in accordance with the purpose of the present invention, a technique is disclosed that identifies host names potentially generated by a domain generation algorithm (DGA). The invention is flexible and may be implemented in a way that adjusts how aggressive the detection means is, i.e., whether the detection means will generate more false positives or fewer.

Existing DGA detection algorithms rely heavily and almost exclusively on string matching and are host name centric. While the present invention uses string matching, it is more user centric. It uses the general randomness of character composition in DGA-based host names for detection, and incorporates a user behavior filtering process to further reduce the possibility of false alarms. And, the present invention is useful in discovering unknown threats, which is generally not possible using traditional signature-based detection. The invention also uses a grouping scheme for detection accuracy.

The invention differs from the prior art in two areas. First, the input data source is user behavior logs, usually Web access logs collected directly from an endpoint, instead of DNS query logs provided by an Internet service provider as in the prior art. This approach allows us to pin down each individual end user; thus, we are able to profile the user's behavior history as additional features rather than using simple string features literally derived from the host names themselves. Second, the objective of the invention is not to identify the entity behind a DGA-based robot network, but to provide warning information directly to end users who are at high risk of accessing malicious DGA-based host names.

In one embodiment, host name raw data from an access log of the computer is first cleansed and then grouped into distinct groups. At least one feature, an alphanumeric or alphabetic-only digest is extracted from each group and its characters are ordered depending upon their frequency of use within that group. Next, sampling is performed upon host names from a large database of known normal host names to generate distinct groups of randomly selected host names. An alphanumeric or alphabetic-only digest is also extracted from each of these groups. The digest from the raw data is compared to each of the digests from the normal host names using a string matching algorithm to determine a value. If the value is above a threshold then it is likely that the host names from the raw data group are domain-generated host names. The suspect host names are used to reference the raw data access log in order to determine which user computers have accessed these host names and these user computers are alerted.

BRIEF DESCRIPTION OF THE DRAWINGS

The invention, together with further advantages thereof, may best be understood by reference to the following description taken in conjunction with the accompanying drawings in which:

FIG. 5 is an example output showing details of particular user computers.

DETAILED DESCRIPTION OF THE INVENTION

It is realized that DGA-based host names may be detected based upon their randomness. In other words, one basic difference between DGA-based host names and normal host names is in the distribution of alphanumeric characters. Despite the fact that some DGAs try deliberately to mimic normal host names generated by a person, most such algorithms simply generate host names using characters and numerals in a simple random manner, since such an algorithm is lightweight and easier to implement.

Motivation for Invention

Figure 1:
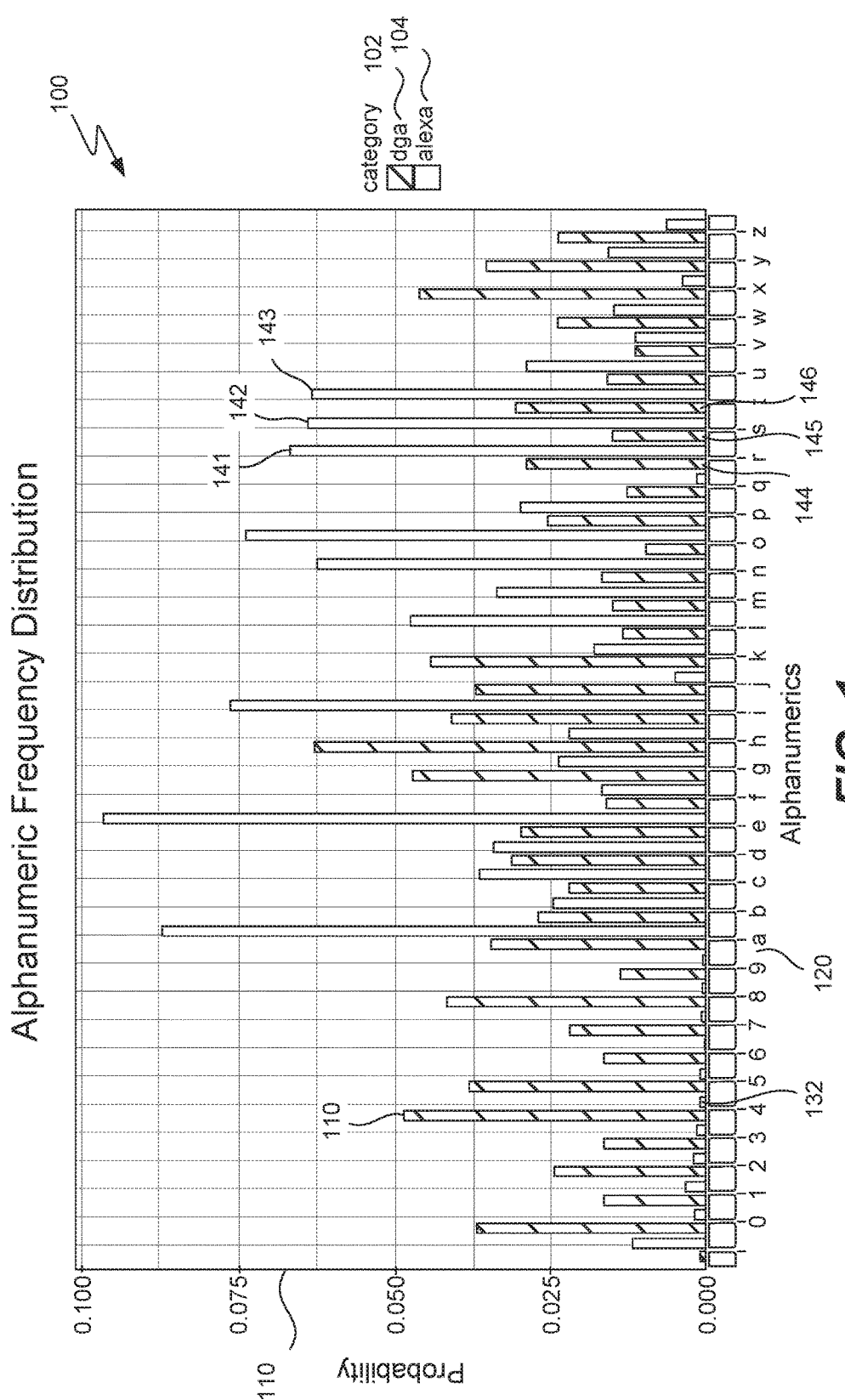
FIG. 1 is a bar graph illustrating the uni-gram alphanumeric frequency distribution between a set of host names generated by a domain generation algorithm and a set of normal host names.

FIG. 1 is a bar graph 100 illustrating the uni-gram (one-character only) alphanumeric frequency distribution between a set of host names generated by a domain generation algorithm 102 and a set of normal host names 104. Here, the probability of occurrence 110 is shown for a range of numerals and characters 120 in the two different sets of host names.

The shaded bars 102 (one for each alphanumeric character) represents host names generated from a domain generation algorithm, while the plain bars 104 represent host names of popular Web sites extracted from a publicly available list of "Alexa.com," a commercial Web traffic data provider, and these may be regarded as a set of host names used ordinarily. It is further realized that the fundamental purpose of a host name is to help Internet users to easily remember the host name without having to remember a somewhat meaningless IP address of random numbers, or of random numbers and letters. It can be shown that ordinary host names tend to use vowels more often than consonants, and use numerals less often than letters. This observation is generally not true for DGA-based host names, in which consonants and numerals can occur irregularly and frequently. For example, consider the character "4" in which its probability of occurrence 131 in a DGA-based host name is nearly 0.05, while its probability of occurrence 132 in a normal host name is practically zero. Or, consider the letters "r," "s," and "t" in which their probability of occurrence 141-143 in a normal host name is at least twice that of their probability of occurrence 144-146 in a DGA-based host name.

Other data also illustrate this difference between DGA-based host names and normal host names. For example, a set of ordinary host names extracted from user behavior logs also shows a very low probability of occurrence of numerals (compared to the relatively high probability of occurrence of numerals as shown in FIG. 1). Furthermore, statistics of a bi-gram distribution (considering two consecutive characters) or even of a tri-gram distribution (three consecutive characters) show a greater difference between normal host names and DGA-based host names, but these are not illustrated here for simplicity. In general, it is realized that DGA-based host names are different from normal host names in that their distribution of alphanumeric characters is anomalous.

Workflow Diagram

In general, the invention takes two sources of data as input, one is user behavior logs (usually client Web access logs), and the other source represents a set of normal host names. The first source is the raw data to be analyzed, while the source for normal host names is the list of popular Web sites collected from the Alexa Web service. In short, the workflow involves two slightly different processing streams, one stream for each type of data source. Once the two processing streams have finished with each source of data, a similarity measurement is performed to determine "how far" host names in the raw data are from those of the normal set. Accordingly, the invention is able to find all accesses to potential DGA-based domains during a particular time period. Further, no endpoint information is required, we can track down potential victims (individuals or entities), and each potential victim can be profiled in order to construct an additional filter.

Figure 2:
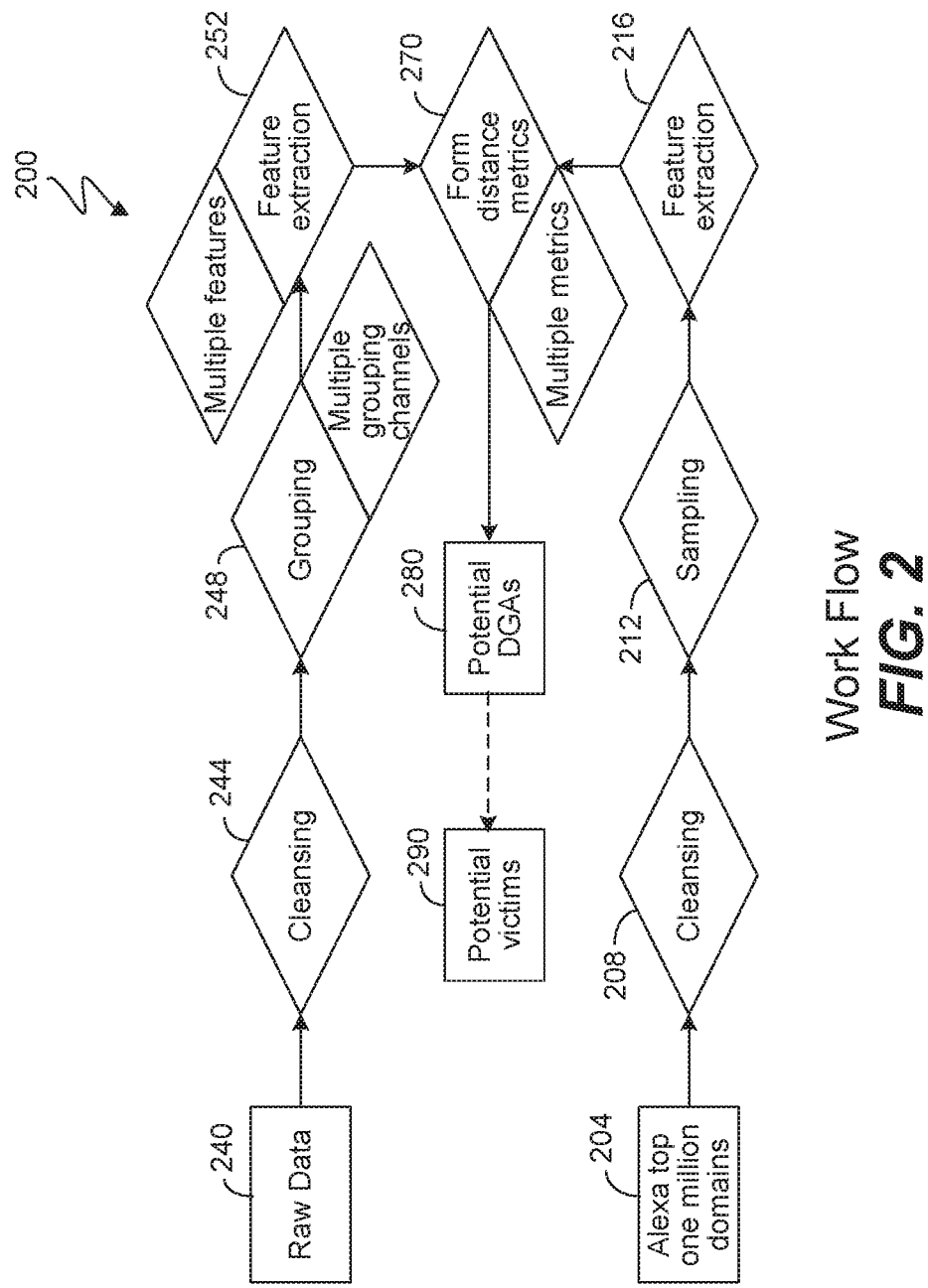
FIG. 2 illustrates a workflow diagram describing an embodiment of the present invention.

FIG. 2 illustrates a workflow diagram 200 describing an embodiment of the present invention. Although two different data streams are described as occurring sequentially, steps from the two data streams may be performed in parallel or may be performed in a different order as described below. In step 204 a set of representative normal domain names is input to the system. These normal domain names are preferably names that have not been generated randomly, such as by a domain generation algorithm. Preferably, they are domain names that have been generated by people in the normal course of business. In one example, the top one million domain names from the Alexa Web service are input. The choice of the representative normal host name data set is not limited to the Alexa popular sites. Any suitable candidate data set that represents non-malicious host names may be used as input in step 204.

In a next step 208, data cleansing is performed upon the representative normal domain names. In this step, all top-level domains and country-code top-level domains are stripped from each domain name and all host names are cast into lowercase. The reason for the stripping is that the top-level domains and the country-code top-level domains may heavily bias the alphanumeric distribution; their deterministic nature is not useful in evaluating the randomness of alphanumeric characters in a given host name. For the same reason, the initial "www" is also stripped (if any). Further, host names that contain invalid characters are discarded (preferably, only the characters "0-9," "a-z," "." "_" and "-" are allowed).

Finally, Gstatic-like domain names are also discarded. There are some benign practical applications that use seemingly randomly-generated strings as part of a host name. Content Delivery Networks (CDNs) regularly adopt such an approach. For example, "gstatic.com" is a domain owned by Google for loading content from their CDN, and its subdomain "metric.gstatic.com" is used specifically for tracking pixels (a technique to track a user click stream). Thus, a domain like "p2-h5pifcc26quck-bc6pytqdwlcqdlna-if-v6exp3-v4.metric.gstatic.com" could legitimately occur. These domains might be identified as being DGA-based by their anomalous character frequency, although they are not malicious. By collecting a huge amount of user Web access logs we are able to automatically determine popular CDNs to form a white list.

Next, in step 212 sample sets are generated at random from the Alexa data (including replacements). In one embodiment, 1,000 sample sets are generated, each sample set containing 500 host names. Each sample set will itself form a group. These resulting 500 host name groups are representative sets that will be compared with the similarly grouped host names collected from the raw data described below. One reason to perform sampling (instead of using the entire set of normal domain names or using another partitioning scheme to form groups of representative normal host names) is to introduce randomness into the model. Since the decision threshold is based on the arithmetic mean of a digest distance of a suspect host name group to the 500 normal digests randomly drawn, as long as a given digest is far away from some of the normal digests, its mean value will go up. In words, a given host name group must be far away from a considerable number of normal digests to be determined to be suspicious. This technique helps to avoid false positives. The introduced randomness in the representative normal host name samples allow a certain degree of deviation from normal.

In step 216 feature extraction is performed upon the groups formed in the previous step. For each group, two unigram digests will be generated. First, the alphanumeric characters used within each group are ranked in decreasing order of frequency of use. Then, for each group, the top ten ranked alphanumeric characters are selected to form a unigram digest string of characters for that group. Next, an alternative digest is formed that excludes the numeric characters. In other words, a second unigram digest is formed for each group, again using the ranked alphanumeric characters and choosing the top ten, but excluding any numerals. This alternative digest is formed in order to reduce false positives involving digital-redundant normal domain names. Thus, we will have two digest strings for each group: one includes only alphabetical characters and the other includes both alphabetical and numeric characters. Each digest string may be thought of as a dimension-reduced representation of the original group of cleansed host names. The string reflects the uni-gram distributional characteristics among the host names within that same group.

Groups with less than ten unique characters (meaning that the length of either corresponding digest is smaller than ten) are simply dropped. These groups do not have enough variety of alphanumeric characters to be considered as potential DGA-based host names. This sub step is performed upon the normal host name data and upon the raw data in step 252. For this representative normal data we will have at most 500*2 (with and without numerals) such digest strings. These digest strings will be compared against digest strings from the raw data as explained below in step 270.

In conjunction with the above steps, or perhaps performed before or after, raw data to be analyzed is also input and processed in a similar manner before comparison in step 270. In step 240 raw data is input into the system. Ideally, this raw data includes the Web access logs from any of a number of computers of an enterprise, reflecting the Web sites that have been accessed by these computers over a period of time. In one particular embodiment, the raw data is obtained from an antivirus product executing upon each client computer within an enterprise, the product arranged to query a database in the cloud regarding each Web site that the client computer views. Alternatively, this raw data may be obtained from Akamai logs, user behavior logs and other Web access logs.

In step 244, data cleansing is performed upon the domain names from this raw data. In this step, all top-level domains and country-code top-level domains are stripped from each domain name and all host names are cast into lowercase. The initial "www" is also stripped (if any). Further, host names that contain invalid characters are discarded (preferably, only the characters "0-9," "a-z," "." "_" and "-" are allowed). Finally, Gstatic-like domain names are also discarded.

Next, in step 248 grouping is performed upon the cleansed data. In this step, all distinct host names are divided into groups. Two grouping methods may be used, although others are possible. The first grouping may be done by grouping the host names by their destination IP address. In other words, all host names having the same IP address will be grouped together. The second grouping may be done by the sub-parent domain of each host name. For example, the host names "abc.xx1.com" and "def.xx1.com" will be grouped together since they have the same sub-parent domain which is "xx1." (Note that TLDs have all been stripped out in the previous step so the character string ".com" is no longer present when the actual grouping takes place.) In another example, the host names "hezl3.xk80p.com" and "14lyu.xk80p.com" will be grouped together. The sizes of these groups will range from two or three up to thousands of host names in a group. In one specific embodiment, groups having a size of less than ten will be discarded. As mentioned, other grouping methods may be used to provide multiple grouping channels. For example, other criteria may be used in order to form host name groups to be examined, such as grouping by length, endpoint, time period, etc.

In step 252, feature extraction is performed upon the groups formed in the previous step. For each group, two unigram digests (multiple features) will be generated. First, the alphanumeric characters used within each group are ranked in decreasing order of frequency of use. Then, for each group, the top ten ranked alphanumeric characters are selected to form a unigram digest string of characters for that group. Next, an alternative digest is also formed that excludes the numeric characters. In other words, a second unigram digest is formed for each group, again using the ranked alphanumeric characters and choosing the top ten, but excluding any numerals. This alternative digest is formed in order to reduce false positives involving digital-redundant normal domain names. Thus, we will have two digest strings for each group, one includes only alphabetical characters and the other includes both alphabetical and numeric characters. Each digest string may be thought of as a dimension-reduced representation of the original group of cleansed host names. The string reflects the uni-gram distributional characteristics among the host names within that same group.

Groups with less than ten unique characters (meaning that the length of either corresponding digest is smaller than ten) are simply dropped. These groups do not have enough variety of alphanumeric characters to be considered as potential DGA-based host names. Of course, it is also possible to generate a fewer number or greater number features from each group. Now that two digest strings have been generated for each group from the raw data (minus the groups that have been dropped), the remaining problem will be to find a distance measure that can determine "how far," on average, a given digest string derived from a group of host names in the raw data is from those digest strings derived from the representative normal data samples.

In step 270 a particular distance measure is used to determine if a particular group of host names from the raw data includes a large number of DGA-based host names. Although a variety of distance measures may be used (multiple metrics), two particular string distance measures that work well together are the Jaccard distance measure and Full Damerau-Levenshtein distance measure that calculate the longest common string. We use two instead of one in order to make a more conservative decision about whether a group of host names are DGA-based hostnames, or are highly composed of DGA-based host names. Of course, only a single string distance measure may be used, and other distance measures may be used to determine the similarity of a given suspicious host name group and a normal representative host name group. For example, other distance measures may be based upon the unigram distribution mentioned above, or may be distance measures designed for the bi-gram or even tri-gram distributions.

For each group from the raw data, the distance between its alphanumeric digest string and all 500 normal digest strings are calculated, i.e., 500 distance measures are calculated for each group from the raw data. The arithmetic mean value of these distances is then recorded thus providing an alphanumeric mean distance from a particular group in the raw data to all of the 500 normal groups. These calculations are performed using both the Jaccard distance and Full Damerau-Levenshtein distance using the alphanumeric digests, thus resulting in two alphanumeric mean distances. Similar calculations are performed using the alphabetic-only digest for a particular group from the raw data, thus resulting in two alphabetic-only mean distances. Once these for mean distances have been calculated, they may be analyzed or combined in different manners to determine if a particular host name is suspicious or not. Of course, fewer or more mean distances may also be calculated.

After all distances have been calculated and the means recorded, we propose that a group from the raw data be considered suspicious if it is far enough from most of the normal groups using any of a variety of metrics. In one example, we consider a group with the following characteristics to be suspicious: the mean alphanumeric Full Damerau-Levenshtein distance is equal to or larger than 9; the mean alphanumeric Jaccard distance is equal to or larger than 0.8; and the ratio of the difference between the mean alphanumeric Jaccard distance and the mean alphabetic-only Jaccard distance to the mean alphanumeric Jaccard distance is smaller than 0.1. Regarding the last ratio, in mathematical notation this would be:

$$\frac{\text{mean alphanumeric Jaccard} - \text{mean numeric Jaccard}}{\text{mean alphanumeric Jaccard}}$$

"Suspicious" means that it is likely that the group has a large number of or is entirely composed of DGA-based host names. The above first two characteristics clearly suggest that the alphanumeric distribution of a given host name group differ greatly from what is normally expected. The third characteristic precludes the chance that a group is considered suspicious only because it contains a lot of numerals. Though the use of numerals is relatively infrequent, it is not sufficient to say that a host name is suspected of being a DGA-based host name merely because it contains lots of numerals.

Of course, other thresholds may also indicate that a group is suspicious. For example, the values given above may be adjusted higher or lower. In general, the thresholds used in forming the above distance metrics to determine whether a group of host names is suspicious may be changed. For example, for a distance that must be larger than a threshold to indicate suspicious, the threshold can be lower, possibly resulting in more false positives). Such tunable thresholds bring flexibility, and can be adjusted case by case. Once a group is considered suspicious, all of the host names in that group will be individually marked as potentially being a DGA-based host name.

In step 280 the host names of the group considered to be suspicious are flagged as being potential DGA-based host names. This group, or each host name, may be output to the screen of a computing device, may be sent to another computer for display or analysis, may be stored into a database, etc., or may be flagged in other manners.

Figure 4:
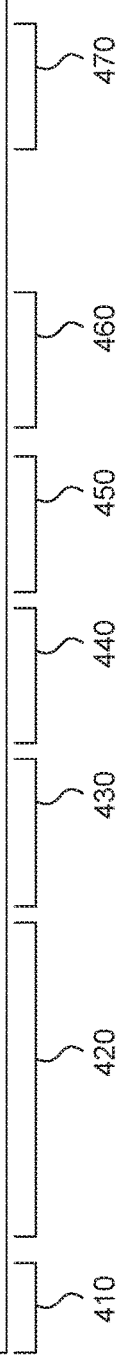
FIG. 4 is an example output showing details of particular user computers.

Further, in step 290 any potential victims may also be notified. Once any suspicious DGA-based host name groups have been identified, we can backtrack to all the endpoint computers that have accessed the host names of this group. We backtrack to each endpoint computer using the raw data, for example, any Web access logs. For example, starting with a suspicious host name from one of the identified groups, we search the Web access log to determine which particular computer accessed this host name and when. This search may be performed for each host name in the suspicious group. After all host names in the Web access log have been marked as suspicious or not by the above-mentioned technique, we can profile each endpoint in the user environment as shown in FIG. 4. Then, a behavior filtering process as described below may be applied. In particular, customers who have offered their Web access logs for analysis may be alerted if it is likely that any of their computers have been accessing potentially malicious Web sites, such as those Web sites that have been generated by a domain generation algorithm.

A filtering technique aiming at reducing false positives can be applied once we have this historical information about the endpoints. A seven-day period is used for analysis of such historical information in the filtering technique, although any time period may be used. Due to the nature of the malicious use of DGA-based host names, the filtering technique only identifies those endpoints which have accessed these host names on more than three occasions within the time period, and, the count of host names accessed must be at least three. Further, the parameters in this filtering technique can be adjusted accordingly, to allow for a more or less conservative approach.

The rationale behind this filtering is that DGA-based host names are periodically used as a callback means for the malicious hackers to take control over the compromised remote machines, and any DGA-based host name accessed by a compromised machine should be changing over time in a relatively frequent manner. Prior art techniques rely too heavily on character frequency distribution only. The disadvantage of that approach is that user behavior is ignored. This filtering technique adds a user-centric point of view that enhances overall detection. For example, due to the changing nature of DGA-based domains, a compromised machine of a user is more likely to connect to different random domains periodically, for instance, on a daily basis. By taking this knowledge into consideration, a host name that is detected as being DGA based by its anomalous character frequency may actually not be DGA based if the same host name is constantly accessed by a user over time. A user machine is more likely comprised if it accesses different, random domains periodically, and these domains are likely DGA based as well.

Endpoints satisfying these criteria for being compromised are at high risk and will be notified. For example, if a particular endpoint user computer accesses a host name from the suspicious group on three or more occasions within a seven-day period, and at least three different host names have been accessed, then it is likely that this computer has been compromised by malware and has been accessing DGA-based host names that are under control of a malicious hackers.

Example of System Outputs

Figure 3:
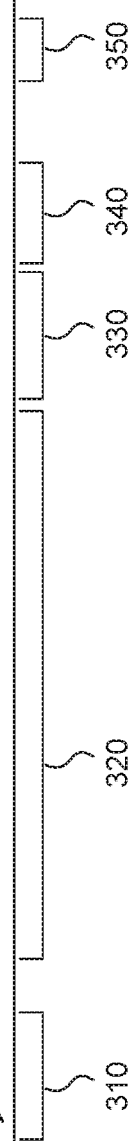
FIG. 3 is an example output of host names that have been identified.

FIG. 3 is an example output 300 of host names that have been identified. As mentioned above, in step 280 host names that have potentially been generated by DGAs are identified and output in some manner. Column 310 simply is a numerical listing of each row of the output. Column 320 lists each host name from the raw data that has been identified as being generated by a domain generation algorithm. In this example, the raw data was grouped by destination IP address and then analyzed, and then grouped by sub-parent domain and then analyzed again. Column 330 lists the result for each host name when a grouping based upon the destination IP address is used. As shown, a "True" result indicates that the host name is DGA-based, while a "False" result suggests that the host name is normal. Column 340 lists the result for each host name when a grouping based upon the sub-parent domain is used. Column 350 is simply the sum of columns 330 and 340, "True" being equal to a "1" and "False" being equal to a "0." In one embodiment, a value of 0 in column 350 indicates that host name is normal, while a value of 1 or greater indicates that the host name is DGA-based.

FIG. 4 is an example output 400 showing details of particular user computers. As mentioned above in step 290, potential victims may be identified once any number of DGA-based host names have been identified by looking back through the raw data (the Web access logs, for example). Typically, an access log (or other similar record of Web site accesses by a client computer) we list row after row of Web accesses, each access including an IP address of a computer, the Web site accessed, the time, and other relevant information such as: total number of logs pertaining to that endpoint (the victim), "n_log"; total number of distinct hosts accessed by that endpoint "n_ho"; total number of distinct DGA-suspicious hosts accessed by that endpoint "n_dga;" total number of distinct active hours for that endpoint, "n_hour," maximum is 24; total number of distinct active hours accessing DGA-suspicious hosts for that endpoint, "n_hour_dga", maximum is 24.

Output 400 shows the results of an analysis performed on a particular access log of an enterprise over a particular time period using identified DGA-based host names. In this example, an enterprise includes ten client computers each having a unique IP address and these client computers have accessed particular Web sites over the Internet over a particular time period. Column 410 is a simple numerical listing of each row of the output. Column 420 is the IP address (such as a private IP address) of each computer present in the access log of the enterprise. Column 430 indicates the number of entries in the access log corresponding to that IP address over the time period. For example, row 482 indicates that computer 5 accessed a variety of host names 33 times in the particular time period. This could mean that the same host name was accessed 33 times, that 33 different host names were accessed, or combination of the two. Column 440 indicates the distinct number of host names accessed by the particular computer. For example, row 486 indicates that computer 8 accessed only 38 distinct host names in a particular time period, but must have accessed some of these host names more than once because a total of 57 accesses were recorded. Column 450 indicates the number of DGA-based host names that were accessed by each computer. For example, row 488 indicates that while computer 10 accessed 124 distinct host names, only 33 of these were DGA-based.

Column 460 indicates the number of distinct hours in a 24-hour time period in which the computer accessed a Web site. For example, while computer 9 accessed a Web site in each hour of a 24-hour time period, computer 10 only accessed a Web site in nine hours out of that 24-hour time period. Column 470 indicates the number of distinct hours in a 24-hour time period in which the computer accessed a DGA-based host name. For example, while the first four computers accessed a DGA-based host name in every hour of a 24-hour time period, the remaining computers accessed DGA-based host names in far fewer hours in that 24-hour time period. Interestingly, rows 482-488 indicate computers that do not access a host name in each hour of a 24-hour time period. These are likely computers used by actual people during a workday, as opposed to the other computers which are likely computers running scheduled jobs or batch jobs.

FIG. 5 is an example output showing details of particular user computers. Shown is row 486 from the previous figure as well as a table 500 showing a subset of the raw log for the computer represented by that IP address. Column 590 indicates the date and time of all accesses for that particular computer; row 592 shows the six DGA-based host names that were accessed; and column 594 is a code showing that each particular host name had already been flagged as being malicious by a software product different from the present invention.

Shown also is a row 482 from the previous figure as well as a table 502 showing a subset of the raw log for the computer represented by that IP address. Column 595 indicates the date and time of all accesses for that particular computer, and row 597 shows the seven DGA-based host names that were accessed. Column 599 is a code showing that while two of the host names had already been flagged as being malicious by another software product different from the present invention, five of the host names (code 71) were not flagged as being malicious by the other software product, but were flagged as being DGA-based host names by the present invention.

Computer System Embodiment

Figure 6A:
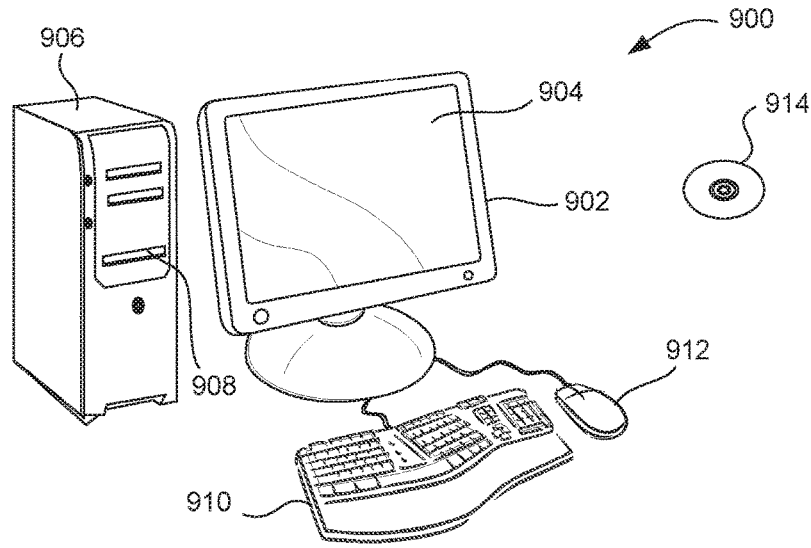
FIGS. 6A and 6B illustrate a computer system suitable for implementing embodiments of the present invention.
Figure 6B:
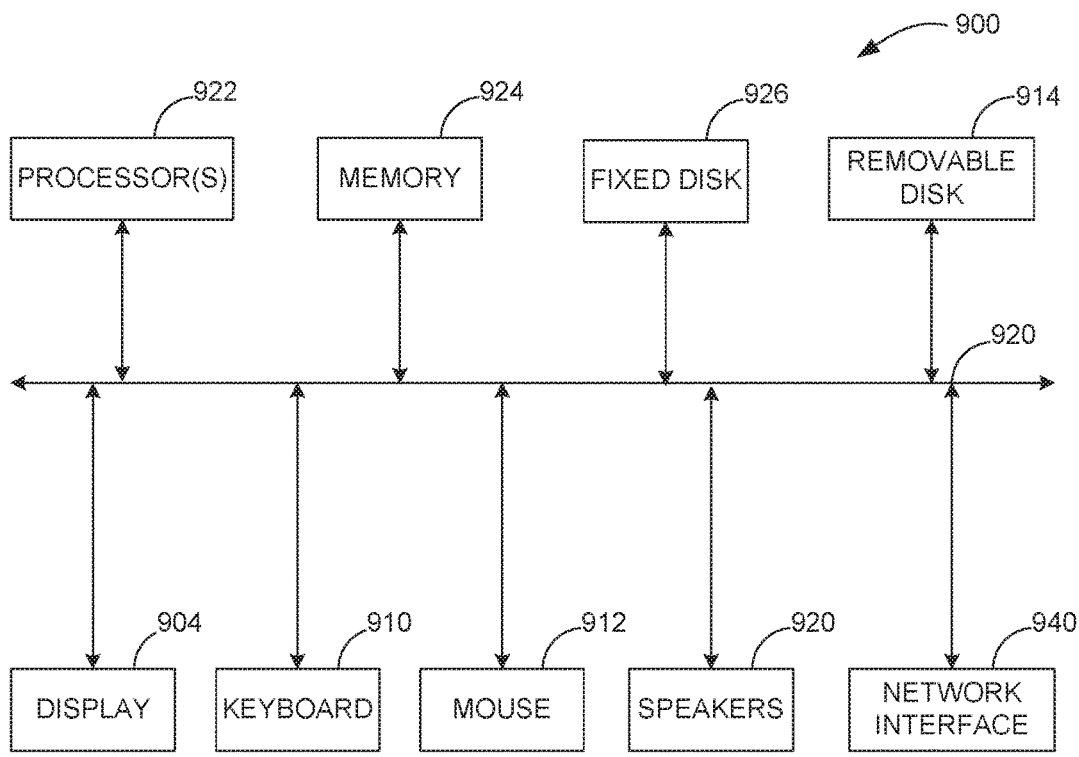

FIGS. 6A and 6B illustrate a computer system 900 suitable for implementing embodiments of the present invention. FIG. 6A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 6B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of detecting host names generated by a domain generation algorithm, said method comprising:
grouping a suspect set of host names obtained from a raw access log of an endpoint computer into a plurality of distinct suspect groups by at least one of a destination IP address and a sub-parent domain, wherein said raw access log reflects Web sites accessed by said endpoint computer over an access period of time and identifies said endpoint computer;
extracting, from one of said suspect groups, a suspect alphanumeric digest string in which characters are ordered by frequency of use within said one suspect group;
grouping a normal set of host names known to not have been generated randomly into a plurality of distinct normal groups wherein said host names in said normal set were generated by humans;
for each of said normal groups, extracting a normal alphanumeric digest string in which characters are ordered by frequency of use within said each normal group;
calculating a distance measure between said suspect alphanumeric digest string and said normal alphanumeric digest strings from said normal groups;
determining that said one suspect group includes host names generated by a domain generation algorithm, indicative of an opportunity for the endpoint computer to be compromised by malicious software, when said distance measure is above a threshold;
identifying said endpoint computer as having accessed host names of said one suspect group; and
determining that said endpoint computer has accessed at least a predetermined number of host names from said one suspect group in a predetermined time period and outputting an indication that said endpoint computer has been compromised by said malicious software.

2. The method as recited in claim 1 wherein said suspect alphanumeric digest strings and said normal alphanumeric digest strings do not include numerals.

3. The method as recited in claim 1 further comprising:
for each of said suspect groups, extracting a suspect alphabetic digest string that does not include numerals and in which characters are ordered by frequency of use within said each suspect group;
for each of said normal groups, extracting a normal alphabetic digest string that does not include numerals and in which characters are ordered by frequency of use within said each normal group; and
calculating an alphabetic distance measure between a suspect alphabetic digest string from one of said suspect groups and said normal alphabetic digest strings from said normal groups.

4. A method of detecting host names generated by a domain generation algorithm, said method comprising:
grouping a suspect set of host names obtained from raw access logs from a plurality of computers into a plurality of distinct suspect groups by at least one of a destination IP address and a sub-parent domain, wherein each of said computers is an endpoint computer and wherein each of said raw access log reflects Web sites accessed by said endpoint computers over an access period of time and identifies said endpoint computers;
for each of said suspect groups, extracting a suspect alphanumeric digest string in which characters are ordered by frequency of use within said each suspect group;
grouping a normal set of host names known to not have been generated randomly into a plurality of distinct normal groups;
for each of said normal groups, extracting a normal alphanumeric digest string in which characters are ordered by frequency of use within said each normal group;
calculating a distance measure between a suspect alphanumeric digest string from one of said suspect groups and said normal alphanumeric digest strings from said normal groups;
determining that said one suspect group includes host names generated by a domain generation algorithm when said distance measure is above a threshold;
identifying one of said computers as having accessed host names of said one suspect group; and
determining that one of said computers has accessed at least a predetermined number of host names from said one suspect group in a predetermined time period and outputting an indication that said one computer has been compromised by malicious software.

5. The method as recited in claim 4, further comprising:
cross-referencing said at least one host name generated by a domain generation algorithm with said raw access logs in order to output an identification of one of said computers that has accessed said at least one host name.

6. The method as recited in claim 4 wherein said suspect alphanumeric digest strings and said normal alphanumeric digest strings do not include numerals.

7. The method as recited in claim 4 further comprising:
for each of said suspect groups, extracting a suspect alphabetic digest string that does not include numerals and in which characters are ordered by frequency of use within said each suspect group;
for each of said normal groups, extracting a normal alphabetic digest string that does not include numerals and in which characters are ordered by frequency of use within said each normal group; and calculating an alphabetic distance measure between a suspect alphabetic digest string from one of said suspect groups and said normal alphabetic digest strings from said normal groups.

8. A method of detecting host names generated by a domain generation algorithm, said method comprising:

accessing sample groups of host names from a database of host names, with each of said host names known to not have been generated randomly such that the host names represent a candidate data set of non-malicious host names;

for each of said sample groups, extracting a normal alphanumeric digest string in which characters are ordered by frequency of use within said each normal group;

grouping a suspect set of host names obtained from a raw access log of a computer into a plurality of distinct suspect groups, wherein said computer is an endpoint computer and wherein said raw access log reflects Web sites accessed by said endpoint computer over an access period of time and identifies said endpoint computer;

extracting, from one of said suspect groups, a suspect alphanumeric digest string in which characters are ordered by frequency of use within said suspect group;

calculating a distance measure between said suspect alphanumeric digest string and said normal alphanumeric digest strings from said sample groups;

determining that said one suspect group includes host names generated by a domain generation algorithm when said distance measure is above a threshold;

identifying said computer as having accessed host names of said one suspect group using said raw access log of said endpoint computer; and determining that said computer has accessed at least a predetermined number of host names from said one suspect group in a predetermined time period and outputting an indication that said computer has been compromised by malicious software.

9. The method as recited in claim 8 wherein said suspect alphanumeric digest strings and said normal alphanumeric digest strings do not include numerals.

10. The method as recited in claim 8 further comprising:
grouping said suspect set of host names by an IP address of each of said host names or by a sub-parent domain of each of said host names.

11. The method as recited in claim 8 further comprising:
for each of said suspect groups, extracting a suspect alphabetic digest string that does not include numerals and in which characters are ordered by frequency of use within said each suspect group;

for each of said sample groups, extracting a normal alphabetic digest string that does not include numerals and in which characters are ordered by frequency of use within said each sample group; and calculating an alphabetic distance measure between a suspect alphabetic digest string from one of said suspect groups and said normal alphabetic digest strings from said sample groups.

12. The method as recited in claim 8 wherein said host names in said normal set were generated by humans.

13. The method as recited in claim 8 further comprising:
grouping said suspect set of host names from raw access logs of a plurality of computers into said plurality of distinct suspect groups.

* * * * *